UNITED STATES PATENT OFFICE.

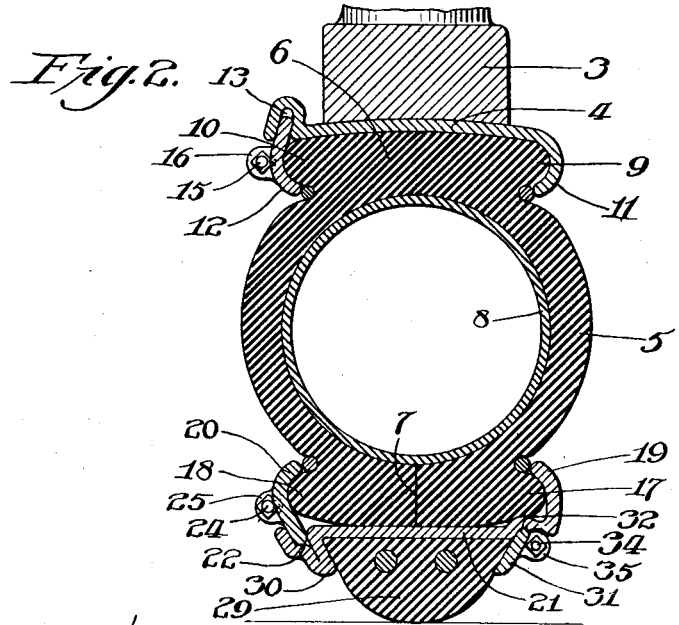
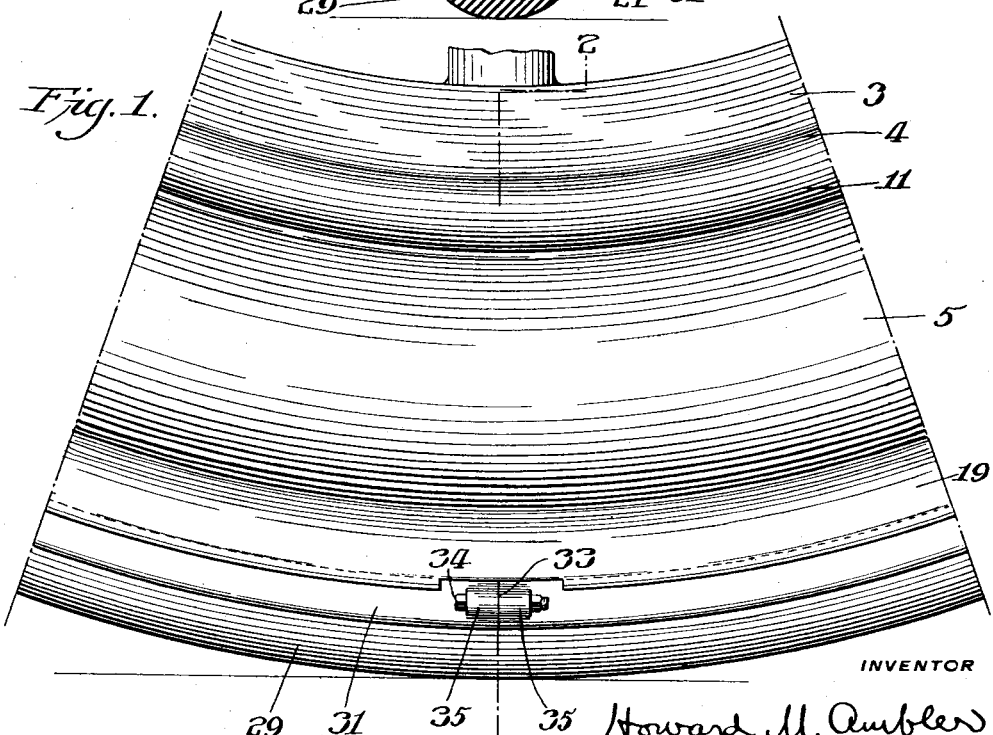

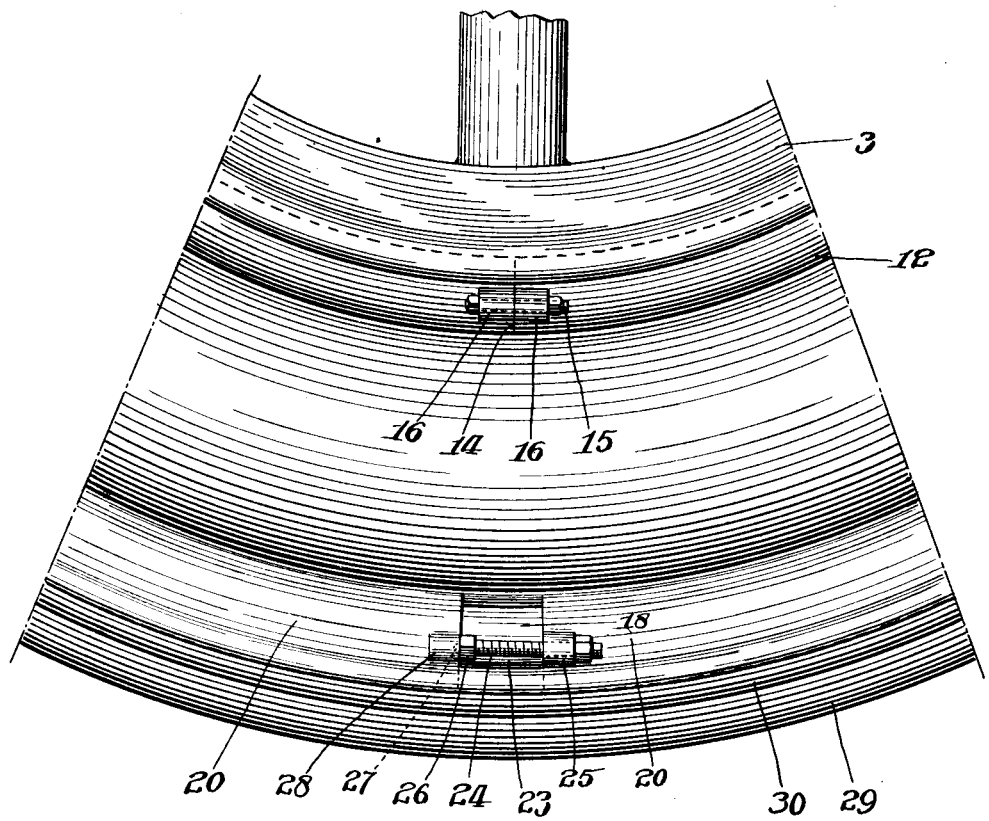

HOWARD M. AMBLER, OF PHILADELPHIA, PENNSYLVANIA.

VEHICLE-TIRE.

1,032,579.  Specification of Letters Patent.  Patented July 16, 1912.

Application filed February 27, 1911. Serial No. 610,981.

*To all whom it may concern:*

Be it known that I, HOWARD M. AMBLER, a citizen of the United States, residing at Philadelphia, in the county of Philadelphia and State of Pennsylvania, have invented certain new and useful Improvements in Vehicle-Tires, of which the following is a specification.

My invention relates to resilient tires for automobiles and other vehicles.

The object of my invention is to provide a novel, simple and efficient construction having provision whereby resilient material within the outer casing of the tire may be readily inserted into the casing or removed therefrom as desired.

A further object of the invention is to provide a metal rim, on the outer or tread portion of the casing, of such construction that it may be readily applied to or removed from the casing and that it will prevent the puncturing of the tread portion of the tire.

A further object of the invention is to provide a supplemental tread portion carried by the outer rim, and means whereby the supplemental tread portion may be readily applied to or removed from the outer rim.

The invention consists in the novel construction and combination of parts herein fully described and particularly claimed.

In the drawings: Figure 1 is a side elevation of a portion of my improved tire as applied to a wheel. Fig. 2 is a transverse section, on the line 2—2 of Fig. 1. Fig. 3 is an elevation of a portion of the side of the tire opposite to the side shown in Fig. 1. Fig. 4 is a detail showing the two adjacent ends of the removable split ring or flange for holding the supplemental tread portion in place.

3 designates the felly of the wheel and 4 the metal rim secured thereto.

5 is the outer casing of the tire which may be formed, as usual, of rubber and textile fabric or which may be formed of any suitable flexible material. The two sides of the casing 5 are formed integral, the inner portion 6 of the casing being closed and the outer portion thereof being provided with a slit 7 which extends entirely around the casing and permits the sides thereof to be separated or opened to permit the removal of the inner pneumatic tube 8, or to permit the inner tube to be inserted into the shoe. Any suitable resilient material may be inserted into the casing 5 in lieu of the pneumatic tube 8. The inner portions of the sides of the casing 5 are provided with projecting annular ribs 9 and 10, as shown. The rib 9 is embraced by an inturned flange 11 formed integral with one side of the rim 4; and the rib 10 is embraced by an inturned flange or ring 12 made separate from the rim 4 and extending into the groove 13 therein.

It will, of course, be understood that all the main parts of the tire are annular and extend around the wheel.

The inner diameter of the ring or flange 12 is smaller than the outer diameter of the groove 13 in order to retain the flange or ring 12 in engagement with the rim 4. The ring 12 is split, as at 14, in order to permit it to be expanded and removed from the groove 13 to permit the casing 5 to be removed from or applied to the rim 4. When the rim 4 is in place, as shown, it is maintained within the groove 13 by a removable bolt 15 extending through bosses 16 on the adjacent ends of the split portion of the ring. When the ring 12 is secured in place by the bolt 15 the shoe 5 is firmly secured to the rim 4 by the inturned portion of the ring 12 engaging the rib 10 and the inturned flange 11 engaging the rib 9. The outer portions of the sides of the casing 5 are provided with projecting annular ribs 17 and 18 which are embraced by inturned annular parts or flanges 19 and 20 respectively. The flange 19 is formed integral with one side of an outer metallic rim 21 which is engaged with the outer or tread portion of the casing 5; and the part or flange 20 is made separate from the rim 21 and extends into a groove 22 therein. The annular part or flange 20 is split, as at 23, to permit the annular part 20 to be expanded or contracted to increase or diminish its diameter. When the flange 20 is applied to the rib 18 of the shoe 5, and groove 22 of the rim 21, the annular flange 20 is contracted to permit it to be inserted into the annular groove 22, after which it is expanded by means of a bolt 24 screwed into and through a boss 25 on one end of the flange 20 adjacent the split portion thereof. The bolt 24 has a nut 26 formed on one end thereof and is provided with a projection 27 extending into a socket formed in a boss 28 on the other end of the flange 20 adjacent the split portion thereof. It will thus be seen that by turning the bolt 24 the adjacent ends of the split flange 20 may be forced apart in a manner to force the flange 20 into the groove 22 and into engagement with the rib 18; and also that the bolt 24 will retain the flange 20 seated within the groove 22. A suitable lock-nut 29 is provided upon the bolt 24 which may be screwed into engagement with the boss 25 to lock the bolt in place. When it is desired to remove the flange 20 to permit the removal of the rim 21 from the shoe 5, the bolt is turned to move it away from the boss 28 thereby permitting the annular flange 20 to be contracted and removed from the groove 22, thereupon the rim 21 may be removed from the shoe. In applying the rim to the casing the tire may be deflated before the flange is inserted into the groove.

Surrounding the rim 21 is an annular tread portion 29 which may be constructed of rubber or other suitable material. This tread portion 29 is retained in place upon the rim 21 between an inturned bent portion 30 on one side of the rim 21 and an inturned annular flange 31 having its inner edge seated within an annular groove 32 formed in the rim 21. The inner diameter of the flange 31 is smaller than the outer diameter of the groove 32 in order to retain the flange 31 in engagement with the rim 21. The flange 31 is split as at 33 in order to permit it to be expanded and removed from the groove 32 to permit the casing 29 to be removed from or applied to the rim 21. When the flange 31 is in place, as shown, it is maintained within the groove 32 by a removable bolt 34 extending through bosses 35 on the adjacent ends of the split portion of the flange 31.

By the construction hereinbefore described it will be readily understood that the tread portion of the tire will be prevented from being punctured by the rim 21; that the inner tube 8 may be readily inserted or removed from the casing 5 as desired; that the tread portion 29 may be readily applied or removed from the rim 21 and that the entire tire may be readily applied to or removed from the rim 4 for renewal or for other purposes.

I claim:

The combination of a pneumatic tire, a metal rim surrounding the same and having an outwardly-extending annular flange on one side thereof and an inwardly extending annular flange on the other side thereof engaging one side of the tire, the inner face of said rim having an annular groove formed therein, the metal of the rim extending outwardly and forming said outwardly-extending flange and a wall of said groove and then extending inwardly and forming the other wall of said groove, a clamping ring extending into said groove and engaging one side of said tire, a tread member surrounding said rim and having one side engaged by said outwardly extending flange and means engaging the other side of said member and retaining it on said rim.

In testimony whereof I affix my signature in presence of two witnesses.

HOWARD M. AMBLER.

Witnesses:
A. V. GROUPE,
G. P. SHARKEY.

Copies of this patent may be obtained for five cents each, by addressing the "Commissioner of Patents, Washington, D. C."